United States Patent [19]
Lange

[11] Patent Number: 5,941,970
[45] Date of Patent: *Aug. 24, 1999

[54] ADDRESS/DATA QUEUING ARRANGEMENT AND METHOD FOR PROVIDING HIGH DATA THROUGH-PUT ACROSS BUS BRIDGE

[75] Inventor: Ronald Edwin Lange, Glendale, Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/721,252

[22] Filed: Sep. 26, 1996

[51] Int. Cl.$^6$ .................................................. G06F 13/00
[52] U.S. Cl. ............................................ 710/129; 710/52
[58] Field of Search .................................... 395/308, 306, 395/309, 310, 307, 848, 872, 292, 280, 285

[56] References Cited

U.S. PATENT DOCUMENTS 4,682,304  7/1987  Tierney ................................. 395/872
5,546,546  8/1996  Bell et al. .

OTHER PUBLICATIONS

"PCI Local Bus, PCI to PCI Bridge Architecture Specification", Apr. 5, 1994, pp. (i)–66.

"DECchip 21052 PCI–to–PCI Bridge Data Sheet", Digital Equipment Corporation, Order Number: EC–QHURA–TE, Jun. 1995, pp. (i)–A2.

*Primary Examiner*—Ayaz R. Sheikh
*Assistant Examiner*—Rupal D. Dharia

[57] ABSTRACT

An arrangement for transferring information between initiating and target buses, using contiguous command buffering and target bus command decoding. A bus interface bridge circuit includes an initiating bus interface which outputs a plurality of commands, where each of the commands includes a corresponding code. A memory queue is coupled to the initiating bus interface to receive the commands, and to contiguously store the commands into the registers of the queue. A target bus interface is coupled to the output of the memory queue to successively receive the commands. The commands are then executed at targeted devices in accordance with their corresponding codes. A method for transferring commands from an initiating bus to a target bus using contiguous command buffering and target bus command decoding is also provided.

26 Claims, 7 Drawing Sheets

COMMAND QUEUE

| CODE 400 | USE 402 | ADDR/DATA 404 | CMD/BE 406 | BE ENCODING 408 |
|---|---|---|---|---|
| RESPONSE | | | | |
| 0000 | NONE | — | — | BIT 3 DEVSEL |
| 0001 | BUFF1 RESPONSE | READ DATA | ENCODED | BIT 2 STOP+MST_ABT |
| 0010 | BUFF2 RESPONSE | READ DATA | ENCODED | BIT 1 TRDY+MST_ABT |
| 0011 | NONE | — | — | BIT 0 LAST CYCLE |
| BUFF1 | | | | |
| 0100 | NONE | — | — | |
| 0101 | NO BURST | DATA | BE | |
| 0110 | BURST | — | BE | |
| 0111 | ADDR CYCLE | ADDRESS | CMD | |
| BUFF2 | | | | |
| 1000 | NONE | — | — | |
| 1001 | NO BURST | DATA | BE | |
| 1010 | BURST | — | BE | |
| 1011 | ADDR CYCLE | ADDRESS | CMD | |
| POSTED WRITES | | | | |
| 1100 | NONE | — | — | |
| 1101 | NO BURST | DATA | BE | |
| 1110 | BURST | DATA | BE | |
| 1111 | ADDR CYCLE | ADDRESS | CMD | |

Fig. 8

ADDRESS/DATA QUEUING ARRANGEMENT AND METHOD FOR PROVIDING HIGH DATA THROUGH-PUT ACROSS BUS BRIDGE

FIELD OF THE INVENTION

The present invention relates generally to computer bus-to-bus bridging architectures. More particularly, this invention relates to a system and method for transferring information between initiating and target buses, using contiguous command buffering and target bus command decoding.

BACKGROUND OF THE INVENTION

Computing systems typically include a computer bussing architecture which allows for the transfer of information, including address, data, and control information. Modern computing systems are often configured to be coupled to various external or peripheral devices, or even to each other. In such situations, the computer buses of the systems or devices must be coupled in a manner as to allow coherent communication between the devices. One such manner of coupling such computer buses is via a bus bridge circuit, which manages the transfer of the information between the buses. The present invention provides a bus bridging arrangement that allows for a high information transfer rate between communicating buses, while providing design flexibility and minimizing unused circuitry.

FIG. 1 illustrates a conventional computer system having a bus bridging architecture for transferring information between a central processing unit (CPU) and various input/output (I/O) components, or other CPUs. I/O components include devices such as floppy and hard disk drives, monitors, user-input devices, and other peripheral devices in a computing system. Bussing architectures and bus bridges couple these I/O components to cooperatively operate within the computer system. Although the present invention is available to many different computer buses, the invention may be described in the context of a bridging arrangement for coupling peripheral component interconnect (PCI) buses.

Referring now to FIG. 1, a personal computing system, or personal computer (PC), having computer buses and bus bridge architectures is shown. A CPU 10 such as an 80486 or Pentium-type microprocessor device, is connected to memory 12, such as a random access memory (RAM), via a host bus 14. A host bridge 16 connects the host bus to a PCI bus, labeled PCI bus-0 18. PCI bus-0 18 is connected to a first PCI device 20, and is optionally coupled to other PCI devices represented by dashed block 22. PCI bus-0 18 is connected, via PCI bridge-1 24, to PCI bus-1 26. PCI bus-1 26 may be connected to PCI option slots 28 into which a first PCI option card 30 is inserted. PCI option card 30 contains a second PCI to PCI bridge 32 which allows interaction between PCI bus-1 26 and PCI bus-2 34. PCI bus-2 34 supports other PCI devices 36, 38, as well as additional PCI devices represented by dashed block 39. Additional PCI option cards 40 may also be inserted in the PCI option slots 28 for connecting additional PCI devices to the CPU 10.

The host bus 14, which couples the CPU 10 to the memory 12, operates at relatively high clock speeds, which provides for a relatively high information transfer rate between the CPU 10 and the memory 12. The host bridge 16, connecting other devices to the CPU 10, operates at relatively lower speeds. The PCI to PCI bridge-1 24 permits the optional extension of the PCI network, so that additional PCI devices can be connected to the CPU 10. The PCI to PCI bridge-1 24 is required to transfer data according to PCI standards, including 32-bit or 64-bit data words at 33 MHz or 66 MHz clock rates respectively.

General bus bridging architectures for transferring information between two buses are known in the art. For example, one prior art system requires two buses coupled to the bus bridge to be locked to allow a direct transfer of data. In another prior art system, an address queue and a data queue are required. The address queue is loaded with an address, and the data queue is loaded with data. The desired queue is then accessed by selecting the appropriate queue output.

Another prior art system is shown in FIG. 2, which illustrates a bridge queuing system having a single address register and multiple data registers. The system of FIG. 2 illustrates the data path for forwarding transactions across the bridge, and only allows the bridge to manage one memory access cycle at a time. The P_AD signal on line 50 is the primary side address/data information which is passed through tri-state buffer 52 and latched in latch 54 prior to being sequentially stored in first-in-first-out (FIFO) queue 56. Eight data buffers, labeled DATA0 through DATA7, are used for either read or write data, and an additional register, labeled ADDRESS, is used to hold and track addresses. Multiplexer 58 then selects the desired information from queue 56, which is then latched in latch 60, and output through tri-state buffer 62 to produce the S_AD signal on line 64 at the secondary side of the bridge. Symmetrical circuitry exists for the secondary side to return data in response to a read command, or to allow the secondary side to initiate a read or write command. This circuitry includes the tri-state buffer 66 for receiving the S_AD address/data information on line 64 and in turn transferring the information to the latch 68. The information is then sequentially stored in FIFO queue 70, which also includes eight data buffers, labeled DATA0 through DATA7, which are analogously used for either read or write data. The FIFO queue 70 also includes an address register analogous to that of the FIFO queue 56, labeled ADDRESS, which again is used to hold and track addresses from the secondary side of the bridge. Multiplexer 72 selects the desired information from queue 70, which is then latched in latch 74, and output through tri-state buffer 76 to produce the P_AD signal on line 50 at the primary side of the bridge.

The prior art system of FIG. 2 has a fixed amount of data that can be transferred for the single address provided This amount is fixed by the number of data registers (DATA0 through DATA7) associated with the single address. Where less than an average of eight data words are associated with write commands, a number of registers remain unused on average. This results in an inefficient use of register space, as the number of registers is set to handle large data bursts, which will likely include a much larger number of data words than is written on average. Furthermore, the prior art system of FIG. 2 has only one address register in each direction, labeled ADDRESS Therefore, each memory cycle must be completed before a subsequent memory cycle can be initiated in the same direction, which can adversely effect data throughput across the bridge.

Accordingly, there is a need for a system and method for providing high data throughput across a bus bridge, while efficiently effectuating the data transfer by optimizing the use of data register space and providing design flexibility. The present invention provides an arrangement which overcomes the aforementioned drawbacks, and offers other advantages over the prior art.

SUMMARY OF THE INVENTION

The present invention is directed to a system and method for providing high through-put information transfers between communicating buses, while using contiguous command buffering to provide design efficiency and flexibility.

In accordance with one embodiment of the invention, the present invention provides a bus interface bridge circuit for transferring commands from an initiating bus to a target bus. An initiating bus interface outputs a plurality of commands, where each of the commands includes a corresponding attribute code. A memory array is coupled to the initiating bus interface to receive the commands, and to contiguously store the commands into the registers of the array. A target bus interface is coupled to the output of the memory array to successively receive the commands. These commands are then executed at targeted devices in accordance with their attribute codes.

In another specific embodiment, the memory array is a first-in-first-out (FIFO) memory queue. The bus interface bridge circuit also includes a plurality of retry registers, each coupled to the initiating bus to receive a different one of the commands. Each of the retry registers is also coupled to the FIFO memory queue to re-enter the commands that are not completed successfully. A multiplexer is coupled to the initiating bus and the retry registers to intercept the commands and retried commands. The multiplexer then designates particular ones of the commands and retried commands to enter the FIFO memory queue, in response to a control signal. The FIFO memory queue contiguously queues the commands and the retried commands as directed by the multiplexer.

In accordance with yet another embodiment, the present invention provides a method for transferring commands from an initiating bus to a target bus. Control codes are appended to each of the commands. These code-updated commands identify characteristics of their corresponding commands. The concurrently pending code-updated commands are contiguously stored, and are provided to the target bus for distribution to target devices. Circuitry at the target bus interface decodes the control codes, to reveal the characteristics regarding the corresponding command, and the commands are executed at target devices in accordance with their identified characteristics.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which:

FIG. 8 is a table representing the control codes in accordance with one embodiment of the present invention.

Figure 1:
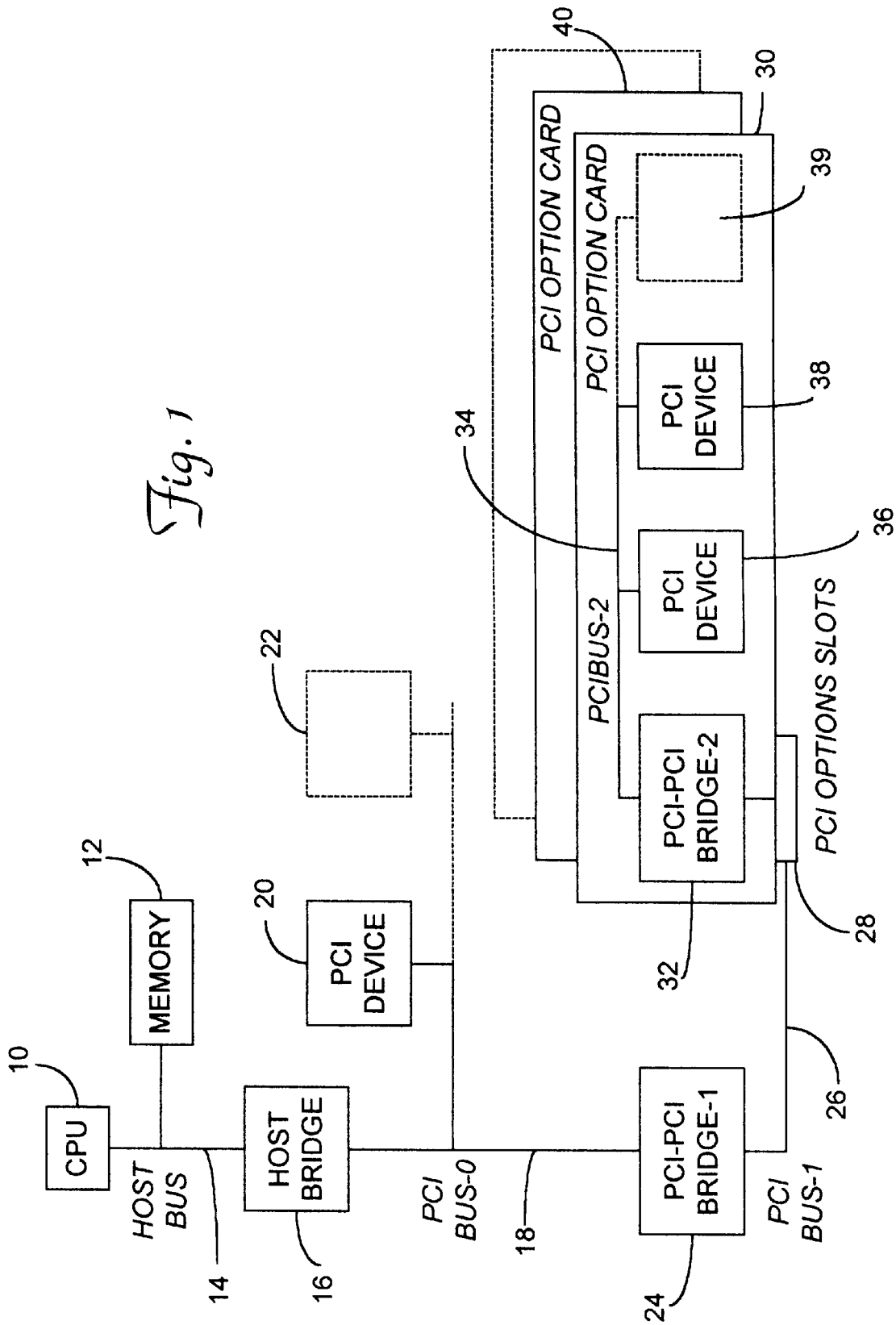
FIG. 1 illustrates a conventional computer system having a bus bridging architecture for transferring information between computer buses.
Figure 2:
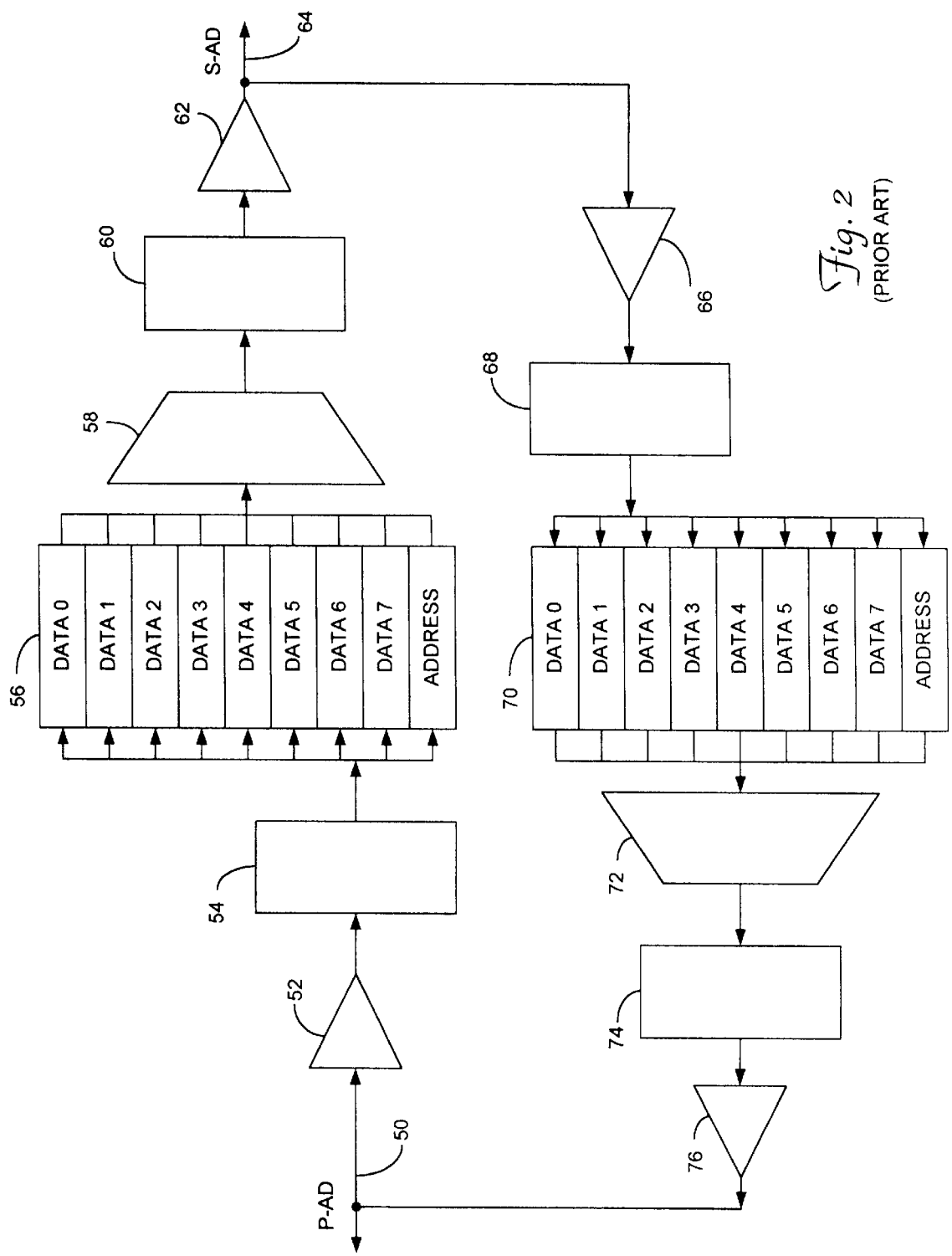
FIG. 2 illustrates a prior art bridging system having a single address register and multiple data registers, which allows the bridge to manage one memory access cycle at a time.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in computing applications requiring high-speed communication between independent buses in computing systems. High-speed interfaces across peripheral component interconnect (PCI) buses, such as shown in FIG. 1, are particularly advantageous. As processing speeds and memory transfer rates increase, it is desirable to incorporate high-speed PCI to PCI bridge devices to take advantage of the increased processing and memory speeds. It is also desirable to provide design flexibility to allow for the expansion of bus transfer rates with minimal modifications to the existing circuitry, and to use valuable printed circuit board or wafer real estate economically, where applicable, in transferring the information between buses. While the present invention may be applicable to many digital communication environments, an appreciation of the invention is best obtained in the context of FIG. 3, in which a PCI to PCI bridge device is shown according to the present invention.

Figure 3:
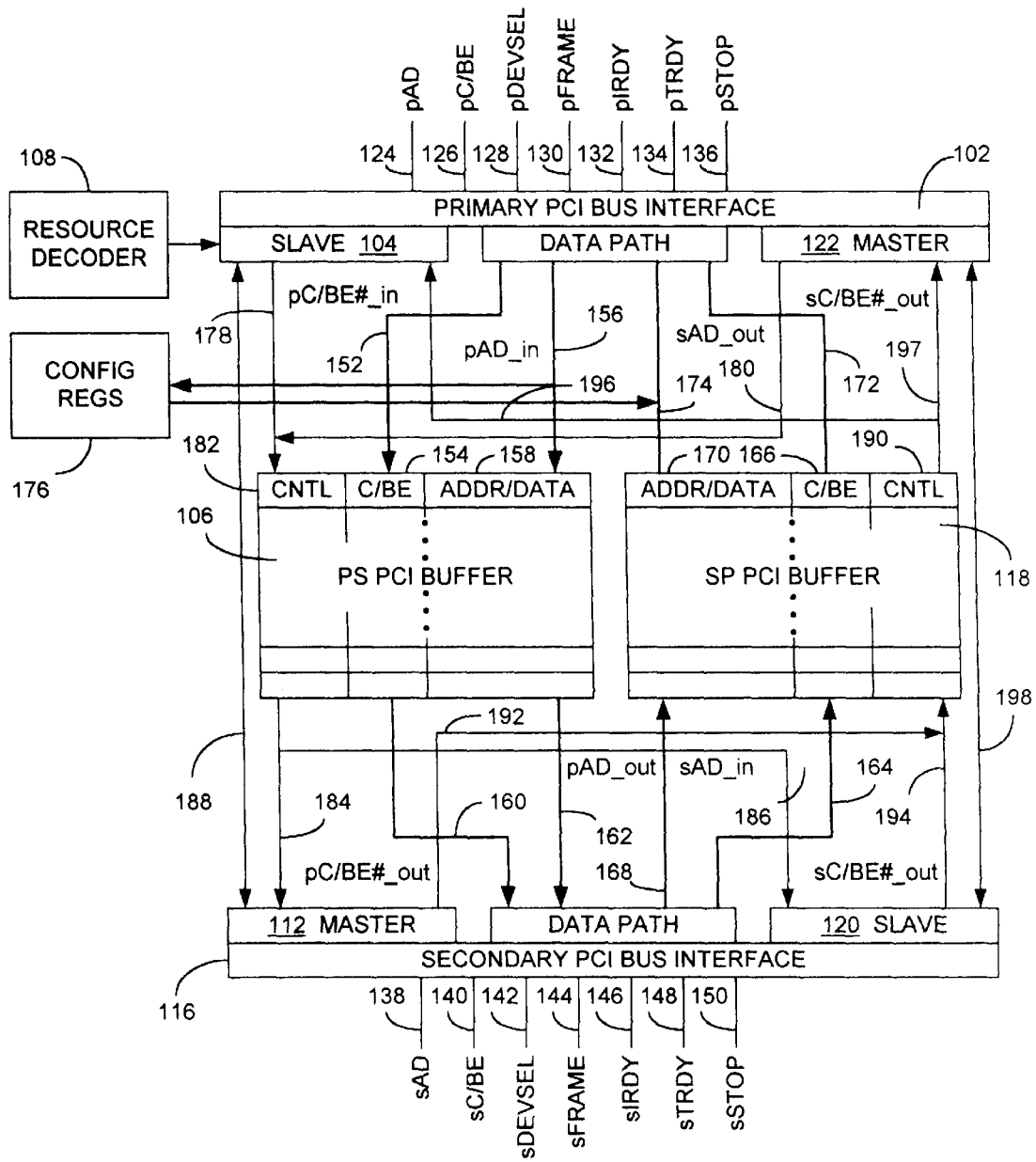
FIG. 3 provides an illustration of the general architecture of a PCI to PCI bridge device.

FIG. 3 provides an illustration of the general architecture of the PCI to PCI bridge device 100. A description of the bridge architecture is provided to give an example of the type of bus bridge in which the present invention is implemented. The PCI bridge device 100 includes a primary PCI bus interface 102 which is the interface between the device and the primary PCI bus. The primary PCI bus interface 102 transmits and receives several input and output signals to the primary PCI bus during the data transfer process. According to PCI standards, the primary PCI bus interface 102 has an associated primary PCI slave 104. The primary PCI slave 104 is responsible for forwarding cycles from the primary bus to the primary-to-secondary (PS) PCI buffer 106, and responds to address decode hits from the resource decoder 108. The primary data path (DP) block 110 transfers command code, byte enable, address, and data information from the primary PCI bus to the PS PCI buffer 106. The primary configuration register 112 receives input from the primary DP block 110. In addition to receiving data from the primary DP block 110, the PS PCI buffer 106 receives control information from the primary PCI slave 104. The control information from the primary PCI slave 104 is transferred to the secondary PCI master 112, and the command code, byte enable, address, and data information in the PS PCI buffer 106 is transferred to a secondary DP block 114. The secondary PCI master 112 and the secondary DP block 114 are both associated with the secondary PCI bus interface 116. The secondary PCI master 112 is responsible for forwarding cycles received on the PS PCI buffer 106 to the secondary bus interface 116.

Since the PCI to PCI bridge device 100 is designed for data transfer in both directions, the architecture is symmetrical. Therefore, the secondary DP block 114 transfers command code, byte enable, address, and data information to the secondary-to-primary (SP) PCI buffer 118, which transfers the information to the primary DP block 110. The secondary PCI bus interface 116 is also associated with a secondary PCI slave 120 which, according to PCI protocol, handles the transfer of data from the secondary side to the primary side. Control information is transferred by the secondary PCI slave 120, to the SP PCI buffer 118, and is thereafter transferred to the primary PCI master 122.

The input and output signals from the primary PCI bus to the primary PCI bus interface 102 include the primary (p) address/data (AD) signal pAD on line 124, which is the address and data information to be transferred. The pC/BE signal on line 126 represents the primary command code (C) and byte enable (BE) data to be transferred across the bridge, and the pDEVSEL signal on line 128 is the signal which represents the PCI device selection. The pFRAME signal on line 130 initiates a data transfer, the pIRDY signal on line 132 is an interrupt ready signal indicating that a command transfer is ready, and the pTRDY signal on line 134 is a transfer ready signal indicating that data is ready to be transferred. The pSTOP signal on line 136 is a stop signal to terminate the data transfer process.

The secondary side of the PCI bridge device 100 has analogous inputs and outputs coupled to the secondary PCI bus interface 116. These signals include at least one secondary (s) address/data (AD) signal sAD on line 138, which is the address and data information to be transferred. The sC/BE signal on line 140 represents the primary command code (C) and byte enable (BE) data to be transferred across the bridge, and the sDEVSEL signal on line 142 is the signal which represents the PCI device selection. The sFRAME signal on line 144 initiates a data transfer, the sIRDY signal on line 146 is an interrupt ready signal indicating that a command transfer is ready, and the sTRDY signal on line 148 is a transfer ready signal indicating that data is ready to be transferred. The sSTOP signal on line 150 is a stop signal to terminate the data transfer process.

Information flows along at least three paths, discussed below. The first path includes the flow from the primary PCI bus interface 102 to the secondary PCI bus interface 116, where the command code and byte enable data, labeled pC/BE#_in on line 152, are transferred from the data path block 110 of the primary PCI bus interface 102 to the C/BE segment 154 of the PS PCI buffer 106. Address and data information, labeled pAD_in on line 156, is passed to the address/data segment 158 of the PS PCI buffer 106. Command code/byte enable is transferred out of the PS PCI buffer 106 as the pC/BE#_out signals on line 160, and the address/data information is transferred out of the PS PCI buffer 106 as the pAD_out signal on line 162. Both the pC/BE#_out and the pAD_out signals on lines 160 and 162 respectively are sent to the data path block 114 of the secondary PCI bus interface 116.

An analogous second path also exists, where command code, byte enable, address, and data information are transferred from the secondary PCI bus interface 116 through the SP PCI buffer 118 to the primary PCI bus interface 102. Command code and byte enable information, labeled sC/BE#_in on line 164, is transferred from the data path block 114 at the secondary PCI bus interface 116 to the C/BE segment 166 of the SP PCI buffer 118. Address and data information, labeled sAD_in on line 168, is transferred from the data path block 114 of the secondary PCI bus interface 116 to the address/data segment 170 of the SP PCI buffer 118. The command code and byte enable information is transferred out of the SP PCI buffer 118 as the sC/BE#_out signal on line 172, and the address and data information is transferred out of the address/data segment 170 of the SP PCI buffer 118 as the sAD_out signal on line 174. Both the sC/BE#_out and the sAD_out signals on lines 172 and 174 respectively are sent to the data path block 110 of the primary PCI bus interface 102.

A third information path is shown providing signals between data path block 110 signals and the configuration registers 176. The pAD_in signal on line 156 is an input to the configuration registers 176, and the configuration registers 176 return data on line 174 to the primary data path block 110. The PCI bridge device 100 is configured by means of registers in the PCI configuration space. The configuration space in the example of FIG. 3 has 256 bytes organized as 64 double-words. This PCI configuration space includes two fields. The first field is composed of the required PCI header which occupies the first 64 bytes of the configuration space. This field consists of registers that uniquely identify the device, and allow the device to be controlled generally. The second field consists of device-specific information and/or control.

In addition to the three data path flows, there are other control paths for controlling the PCI bridge device 100. Control codes are transferred to the PS PCI buffer 106 from the primary PCI slave 104 on line 178, and from the primary master 122 on line 180. These control codes are stored in the type segment 182 of the PS PCI buffer 106 from where it is transferred to both the secondary PCI master 112 and the secondary PCI slave 120 along paths 184 and 186 respectively. Additionally, the primary PCI slave 104 can communicate directly with the secondary PCI master 112 through path 188.

Analogously, the secondary PCI master 112 and the secondary PCI slave 120 transfer control codes to the type segment 190 in the SP PCI buffer 118 on lines 192 and 194 respectively. The control codes are transferred out of the type segment 190 in the SP PCI buffer 118 to the primary PCI slave 104 and the primary PCI master 122 along paths 196 and 197 respectively. In addition, the primary PCI master 122 can communicate directly with the secondary PCI slave 120 via path 198.

Figure 4:
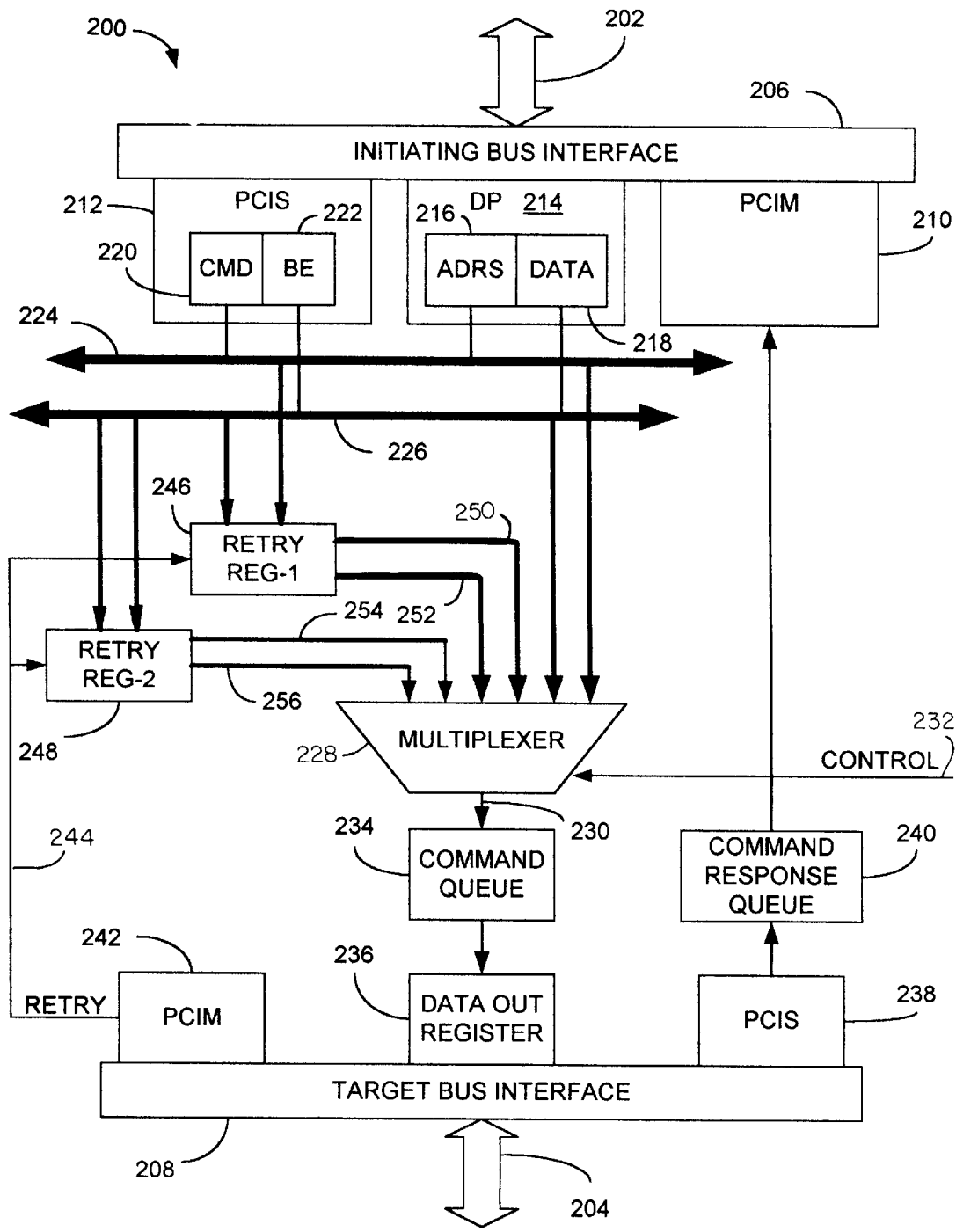
FIG. 4 provides a block diagram illustrating one arrangement of a bus bridge in accordance with the present invention.

In one aspect of the present invention, contiguous buffering of information transferred from a first bus to a second bus is allowed, thereby minimizing dependency on memory queue size while providing fast data through-put. One embodiment of this aspect of the invention can be implemented through the use of a memory queue, where various types and sizes of command information are stored into the same memory queue, with minimal, if any, unused memory space between successively stored commands. Commands can be decoded at the target bus to determine command type, size, and other command parameters. FIG. 4 provides an arrangement of a bus bridge, such as the PCI bridge device 100 of FIG. 3, which implements this aspect of the present invention.

Referring now to FIG. 4 a block diagram illustrating one arrangement of a bus bridge 200 according to the present invention is provided. The initiating bus 202 and the target bus 204 represent many different types of computing system buses, and in the embodiment of FIG. 4 are PCI buses. Either bus 202 or 204 can be the initiating bus, as the initiating bus refers to the bus initiating a command. For the example of FIG. 4, it will be assumed that bus 202 will be initiating a command rather than bus 204, and therefore bus 202 will be referred to as the initiating bus, and bus 204 as the target bus.

The target bus 204 is coupled to one or more devices targeted by the initiated command.

The initiating bus 202 is coupled to the initiating bus interface 206, which is the primary (p) PCI bus interface in the current example. The target bus 252 is coupled to the target bus interface 208, which is the secondary PCI bus interface in the current example. The initiating bus interface 206 is coupled to a master and a slave block, labeled as the PCIM 210 (master) and the PCIS (slave) 212 respectively. The address and data information interfaces to the initiating bus interface 206 via the data path (DP) block 214. Fields ADRS 216 and DATA 218 shown in DP 214 pass the address and data between the initiating bus interface 206 and the target side of the PCI to PCI bridge 200. The command code and byte enable information interfaces to the initiating bus interface 206 via the PCIS 212, where the command field CMD 220 and the byte enable field BE 222 pass the command code and byte enable information between the initiating bus interface 206 and the target side of the PCI to PCI bridge 200.

The commands passed between the initiating bus 202 and the target bus 204 may be memory access commands, such as read data and write data commands. In the arrangement of FIG. 4, read commands include at least an address, a command code, and byte enables, and write commands include at least an address, a command code, byte enables and the associated data to be written. Both read and write commands include the address from the ADRS field 216 and the command code from the CMD field 220. The address and command code are combined into one information field which is represented by the addr/cmd bus 224. For write commands, the data to be written and associated byte enables are included in the command, and the data and byte enables are combined into another information field represented by the data/be bus 226. Therefore a read command will include the information field of the address and command code. A write command will include the first information field comprising the address and command code, and one or more second information fields comprising data and byte enables. The number of second information fields depends on the amount of data being written to the target bus 204. In one embodiment of the invention, each information field includes 32 bits (one double-word, or D-word) for the address or data, and 4 bits (one nibble) for the command code and byte enable. The read commands and the write commands therefore contain different total numbers of byte transfers, and the number of bytes associated with write commands varies depending on the number of bytes written.

The commands issued from the initiating bus interface 206 via the PCIS 212 and the DP 214 are transferred to the multiplexer 228 via the addr/cmd bus 224 and the data/be bus 226. The multiplexer 228 selects one of its inputs to be pass to line 230, depending on the state of control signals represented by line 232. The command information on buses 224 and 226 are multiplexed to allow the address/command code and data/byte enable information to be separately queued in the command queue 234. Read and write commands, including their corresponding information fields from buses 224 and 226, are successively queued into the command queue 234 in the order that they were initiated on the initiating bus 202. The command queue 234 will be further described in connection with FIG. 5.

The queued commands in the command queue 234 are outputted to the target bus interface 208 via the data out register 236. The commands are executed by the targeted devices, and if a targeted device successfully completes its associated command, the target device sends a command response across the target bus 204. A slave device, labeled PCIS 238, is coupled to the target bus interface 208 to receive the command responses from the target bus 204, and forward the command responses to the command response queue 240. Particular command cycles are completed when a command response is returned to the initiating device via the PCIM 210.

The control codes are received at the target bus interface 208, where they are decoded. Decoding of binary information is known in the art, and various methods for decoding the bits comprising the control codes may be used without departing from the scope and spirit of the invention. In one embodiment of the invention, the control codes include a binary bit pattern which is decoded by hardware in the PCI master (PCIM)

Multiple command-initiating devices may be present in a system, which can lead to multiple commands being issued in parallel. Additional commands from the initiating bus 202 are queued in the command queue 234. The command queue 234 is a first-in-first-out (FIFO) device that collectively stores all of the commands that are issued from the initiating bus 202. The multiplexer 228 allows each of these commands to be stacked in the command queue 234 according to the state of the control signals represented by line 232. Each of the command-initiating devices generates a control signal to control the multiplexer 228 and pass the command to the command queue 234.

Where the targeted device is not able to complete a particular command, the PCIM 242 on the target bus interface 208 can issue a retry signal on line 244 to the retry registers REG-1 246 or REG-2 248. One of the retry registers will be signaled to retry a command, and the appropriate one of the retry registers is selected by way of a control code that is part of the command response.

The retry registers 246 and 248 allow a command to be retried by reloading the command into the command queue 234. When the command is originally issued by the initiating device on the initiating bus 202 and is stored into the command queue 234, it is also stored into one of the available retry registers. The retry registers each store one complete command, including the address, data, command code, and byte enable information forwarded by the PCIS 212 and the DP 214.

When a particular retry register receives a retry signal on line 244, it reloads the command onto the command queue 234 in a manner similar to the loading of originally-issued commands. The address and command code from the addr/cmd bus 224, and the data and byte enables from the data/byte enable bus 226 are input into the retry register available to the command-initiating device. Upon receiving the retry signal, the particular retry register transfers its stored command to inputs of the multiplexer 228. The address and command code from retry REG-1 246 are transferred to the multiplexer 228 inputs via bus 250, and the data and byte enables are transferred to the multiplexer 228 inputs via bus 252. Similarly, the address and command code from retry REG-2 248 are transferred to the multiplexer 228 inputs via bus 254, and the data and byte enables are transferred to the multiplexer 228 inputs via bus 256. The control signal on line 232 allows selection of the retry information on buses 250, 252, 254 and 256, which allows the retried command to be requeued on the command queue 234. The control signals represented by line 232 are generated at the PCI slave (PCIS) 212 where the command is initiated at the initiating bus. During the time that the PCIS 212 is sending a command, it enables a control signal to pass that command through the multiplexer 228 to the command queue 234. Also, the PCIS 212 will provide the control signals necessary to pass the commands stored in the retry registers REG-1 246 and REG-2 248. Furthermore, where a command is initiated at bus 204, and the initiating bus 202 is therefore operating as a target bus, bus 202 may return data if the command sent to bus 202 was a read command. In such a case, the PCI master (PCIM) 210 provides a control signal to the multiplexer 228 to allow selection of the appropriate command or retry command.

FIG. 4 illustrates two retry registers REG-1 246 and REG-2 248, however additional retry registers may be used, which would result in additional retry registers through REG-n (not shown). For example, where there are two command-initiating devices on the initiating bus 202, two retry registers may be used. Where a larger number of command-initiating devices are present on the initiating bus 202, a correspondingly larger number of retry registers are used. Command retries may be determined in a manner described herein and in copending U.S. patent application, Ser. No. 08/718,971, (Attorney docket number 11422.33-US-01) entitled "Arrangement and Method for Allowing Sequence-Independent Command Responses Across a Computer Bus Bridge", which is assigned to the assignee of the instant application and filed concurrently herewith, the contents of which are incorporated herein by reference.

Figure 5:
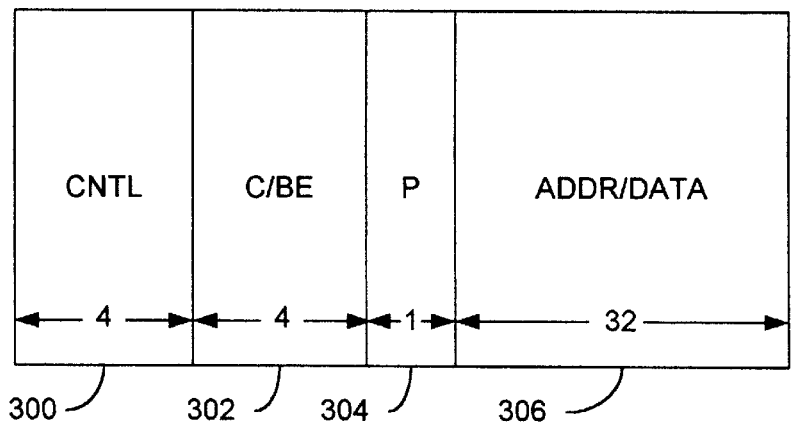
FIG. 5 illustrates one arrangement of the storage register division of the command queue.

Referring now to FIG. 5, the storage register division of one embodiment of the command queue 234 is shown. A single command queue 234 is used in the PCI to PCI bridge 200. This command queue 234 queues all read and write commands from the initiating bus. The command queue 234 in the example of FIG. 5 includes a control field CNTL 300, a command/byte enable field C/BE 302, a parity field P 304 and an address/data field ADDR/DATA 306. The ADDR/DATA field 306 shown is a 32-bit field corresponding to the 32-bit address field and 32-bit data field provided by a PCI bus. The P field 304 shown is a 1-bit field dedicated to storing a parity bit. The C/BE field 302 and the CNTL field 300 are each shown as 4-bit fields.

Because the single command queue 234 is used for both read and write commands, read and write commands are stacked upon one another in the command queue 234. Read and write commands include a first entry having an address (ADDR) in the ADDR/DATA field 306 and a command code (CMD) in the C/BE field 302. The command code (CMD) identifies the command, e.g., a read or write command. Write commands include one or more subsequent entries having data (DATA) in the ADDR/DATA field 306 and byte enables (BE) in the C/BE field 302. The number of subsequent entries depends on the number of bytes of data to be written. The parity field 304 stores a parity bit for verifying the accuracy of the data for write commands. The control codes in the CNTL field 300, which accompany each command and command response, perform a variety of functions, and will be further described in connection with FIG. 8.

Figure 6:
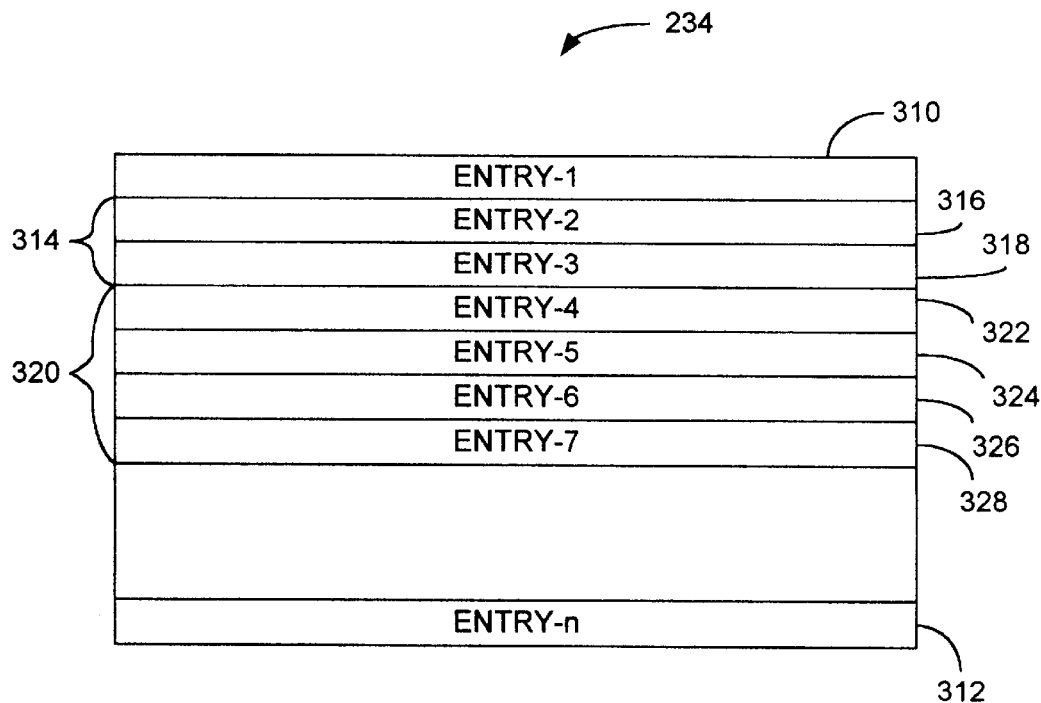
FIG. 6 illustrates one manner in which multiple commands are contiguously queued into a single command queue.

FIG. 6 illustrates one manner in which multiple commands are contiguously queued into the single command queue 234. As previously described, one prior art system included the use of a separate address register and data queue. This results in a limited number of data word bursts, limited by the number of data registers. Further, the single address register requires completion of the current memory cycle prior to initiation of a subsequent memory cycle in the from the same initiating device. The arrangement and configuration of the present invention allows contiguous queuing of the read and write commands from the initiating bus 202 to the target bus 204, and of the command responses where bus 204 assumes the role of the initiating bus. A single FIFO can therefore be utilized, thereby minimizing unused register real estate, providing greater flexibility, and increasing data throughput.

Referring now to FIG. 6, the command queue 234 is shown having a plurality of commands. In accordance with the example of FIG. 5, each command includes one or more individual entries. Each individual entry in the queue is 42 bits, including the CNTL field 300, the C/BE field 302, the P field 304, the ADDR/DATA field 306, and an additional 1-bit field (not shown) which is unused for purposes of the present invention.

The entries in command queue 234 range from entry-1 310 to entry-n 312. Each individual entry may comprise an entire command, or a portion of a command. For example, register segment 314 may be a read command with two byte enables, or a write command with data. Entry 310 by itself may include a returned data word or a returned status. The CNTL field 300 will indicate to the receiving circuitry that the entry-1 310 is a complete read command. This transfer of information via the CNTL field 300 allows different command types, e.g., read and write commands and returned data/status. The different command types are stored in the same queue for temporary storage prior to processing the command, while informing the target bus of its type and size. This allows all commands to be contiguously entered into the same queue, thereby minimizing inefficiencies in the use of register space.

Referring again to FIG. 6, a register segment 314 is shown including two register entries labeled entry-2 316 and entry-3 318. Register segment 314 provides register space for a two-entry command. For example, entry-2 316 may be a write command including an address in the ADDR/DATA field 306, and a write command code in the C/BE field 302. Entry-3 318, which is part of the write command, includes the data in the ADDR/DATA field 306, and the required byte enables in the C/BE field 302.

Write commands can be of various sizes, depending on the number of data words to be written. Register segment 320 includes 4 entries, including entry-4 322, entry-5 324, entry-6 326 and entry-7 328. Entry-4 322 includes an address in the ADDR/DATA field 306, and a write command code in the C/BE field 302. Entry-5 324, entry-6 326, and entry-7 328 each include data in the ADDR/DATA fields 306, and the required byte enables in the C/BE fields 302 of each of the entries.

The command queue 324 also stores data being transferred in response to a read command from an initiating device. Referring briefly to FIG. 4, either of the buses 202 or 204 can operate as the initiating bus. Therefore, the command queue 234 will collect command responses to be returned to initiating devices on bus 204, just as the command response queue 240 collects command responses to be returned to initiating devices on bus 202. The nomenclature used in FIG. 4, specifically the command queue 234 and the command response queue 240, is used for clarity to understand a transaction initiated on bus 202. However, these queues perform analogous functions, as either bus 202 or 204 can actually transfer the initiated command.

Referring now to FIGS. 4 and 6, command queue 234 can therefore acquire the role of a command response queue, where a device on bus 204 initiates a command. Data returned in response to a read command is stored as entries in the queue 234, acting as a command response queue. For example, register segment 314, including entry-2 316 and entry-3 318, may include read data in the ADDR/DATA field 306, which is identified as returned read data by the information in the control code occupying the CNTL field 300.

The command queue 324 therefore provides a single queue for all command types and sizes, and provides the flexibility required for read and write commands associated with various numbers of data words. The command queue FIFO can be replaced with a larger FIFO, thereby allowing a greater number of commands and corresponding entries, without requiring design changes to the remainder of the bridge circuit. This is made possible by contiguously entering each type and size of command, and appending an identification, i.e., the command code, to the particular commands.

Figure 7:
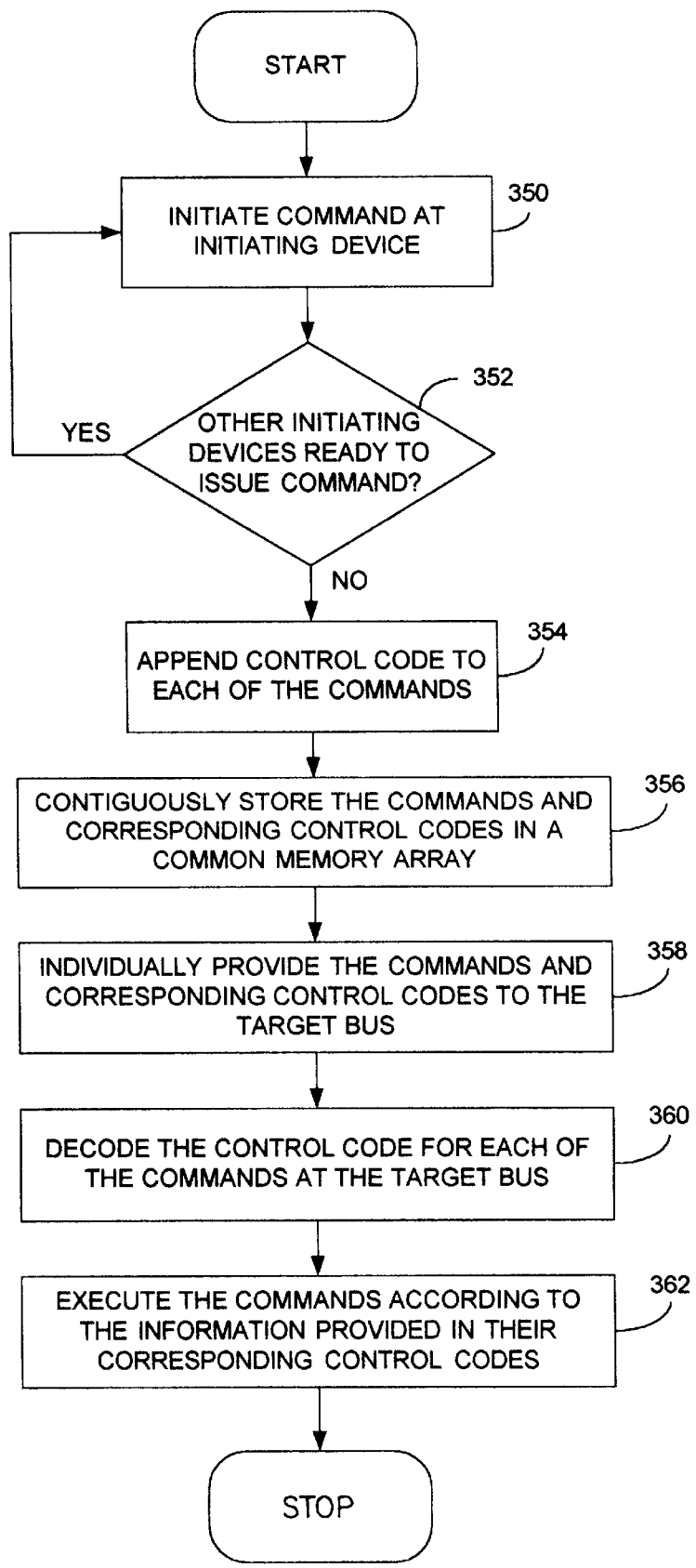
FIG. 7 is a flow diagram illustrating one manner in which commands are transferred across the bus bridge in accordance with the principles of the present invention.

FIG. 7 is a flow diagram illustrating one manner in which commands are transferred across the bus bridge in accordance with the principles of the present invention. Referring first to step 350, a command is initiated from a device on the initiating bus 202 to the target bus 204. Decision step 352 determines whether other initiating devices are prepared to initiate a command. Multiple commands can be concurrently pending. This is due to various reasons, including multiple command-initiating devices on the initiating bus 202 and the possibility of having commands retried from the retry registers REG-1 246 and REG-2 248. Where other initiating devices, including the retry registers, are ready to issue a command, processing returns to step 350 where the command is initiated. Otherwise, processing continues to step 354. The YES and NO paths emanating from step 352 may be implemented concurrently.

Step 354 includes appending an identifying control code to each of the commands. The control code allows the command to be identified at the target bus, which makes it possible to contiguously store the commands in a common memory array as described in step 356. The control code provides command attributes such as the command type and command size, so that the target device can receive any particular command from the command queue 234 and properly process the command.

Each of the commands is provided to the target bus in a predetermined arrangement. In the examples provided in FIGS. 3, 4, 5 and 6, the command queue 234 performs a first-in-first-out (FIFO) function. Step 358 illustrates that each of the commands, and corresponding control codes, are individually provided to the target bus. The commands are provided in whatever the predetermined manner requires. In the context of the examples provided, the command queue 234 performs a queuing function, and the commands are provided to the target bus in a first-in-first-out fashion.

The control codes are received at the target bus, where they are decoded at step 360. Decoding of binary information is known in the art, and various methods for decoding the bits comprising the control codes may be used without departing from the scope and spirit of the invention. When the attributes of the command are determined, such as command type, command size, last byte of write data, etc., the commands are executed at step 362 in accordance with the attribute information provided in the corresponding control codes.

FIG. 8 is a table representing the control codes in accordance with one embodiment of the present invention. The control code, from the CNTL field 300, identifies the command or command response. As previously described, the control code also indicates whether a command response is associated with retry register REG-1 246, retry register REG-2 248, or another retry register available in the bridge.

Referring now to the table columns in FIG. 8, the code column 400 represents the various bit patterns of the control code and the various control categories. Four control categories are listed in the example of FIG. 8, including the "response", "buff1", "buff2", and "posted write" categories.

The response category indicates the situations where a command response is returned to the command response queue 240. Where the response bit pattern is "0 0 0 1", the use column 402 indicates that a "buff1 response" has occurred, which indicates that the response is associated with a command stored in retry REG-1 246. Similarly, where the response bit pattern is "0 0 1 0", the use column 402 indicates that a "buff2 response" has occurred, indicating that the response is associated with a command stored in retry REG-2 248. These command responses, labeled "data" in the addr/data column 404, may be associated with read data in the ADDR/DATA field 306, or with non-posted write status information. The cmd/be column 406 corresponds to the C/BE field 302, and the contents of the C/BE field are encoded during a command response, as seen in the BE encoding column 408.

The "buff1" category in the control code column 350 relates to those commands that are issued from a first initiating device and stored in the retry REG-1 246. The "buff2" category similarly relates to those commands that are issued from a second initiating device and stored in the retry REG-2 248. In one embodiment, where the codes end in "01", buff1 and buff2 are used in the instances of non-posted writes or single data reads. Where the buff1 bit pattern is "0 1 0 1", or the buff2 bit pattern is "1 0 0 1", the use column 402 indicates that "no burst" of data will occur. Where a single double-word (D-word) of data is being transferred, a "no burst" will be provided with the data, to indicate that no additional data will follow that single D-word. Where multiple D-words of data are requested, the entry in buff1 has the "0 1 1 0" pattern, which indicates a request for a data "burst", and the PCIM 242 requests a predetermined number of read requests, e.g., including 8 D-words. Similarly, each D-word transferred from buff2 will have a "1 0 1 0" pattern, indicating that a data "burst" has been requested, and additional data will follow. In each case where a burst of data occurs, the last D-word in the data packet will have the control code corresponding to "no burst", as it signifies that the corresponding data is the last of the data to be transferred, and no additional data will follow. Where data is being transferred, the cmd/be column 406 shows that byte enables are being transferred, rather than a command code, in the cmd/be field 302.

For both the "buff1" and "buff2" categories, a bit pattern of "0 1 1 1" and "1 0 1 1" respectively relates to an "address cycle" in the use column 402, where an address and command will be used in the ADDR/DATA field 306 and C/BE field 302 respectively, as seen in columns 404 and 406.

Where data writes are "posted", similar results occur. Write data is "posted" when the data is configured to be accepted immediately by the target device, and the target has accepted responsibility for the command. The target takes responsibility to complete the operation by accepting the posted write command, and responds to the initiator that the command will be completed at the target. The cycle is complete on the initiating side when the target responds that it will accept responsibility for the command. Analogously, a "non-posted" memory transaction is one where the action must be completed on the target side before the target will return a response indicating a completed command cycle. The initiator passes the data through the bridge, and initiates a command cycle on the target on the other side of the bridge. The target then completes the action directed by the command, and sends a response to the initiator. The initiator never relinquishes its responsibility for completing the cycle as in the posted memory transaction. Read commands are "non-posted" memory transactions, because they require the return of data to complete the cycle.

The table of FIG. 8 further includes a BE (byte enable) encoding column 408 listing the byte enable encoding for the buff1 and buff2 responses from the "use" column 402. The byte enable encoding comprises four bits, labeled bit 3 through bit 0 as shown. These bits correspond to the target bus status at the time of the cycle completion or data transfer, and with bit 0 indicating whether it is the last cycle in the response transfer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bus interface bridge circuit for transferring commands from an initiating bus to a target bus, the bus interface bridge circuit comprising:

an initiating bus interface configured and arranged to output a plurality of revised commands, wherein each of the commands includes a corresponding separately-decodable attribute code, each of the revised commands including appended information that identifies whether the command is a read data command or a write data command and number of bytes of the corresponding command;

a memory array having a plurality of data registers configured and arranged to contiguously store the plurality of revised commands;

a target bus interface, coupled to the memory array to successively receive the commands, and to decode and execute the commands at targeted devices in accordance with their attribute codes; and a plurality of retry registers, each coupled to the initiating bus to receive a different one of the plurality commands, and each coupled to the memory array to re-enter the commands which are not successfully completed at the target bus.

2. The bus interface bridge circuit of claim 1, wherein the memory array comprises a first-in-first-out (FIFO) memory queue.

3. The bus interface bridge circuit of claim 1, further comprising a plurality of retry registers, each coupled to the initiating bus to receive a different one of the plurality of commands, and each coupled to the memory array to re-enter the commands which are not successfully completed at the target bus.

4. The bus interface bridge circuit of claim 3, further comprising a multiplexing circuit, coupled to the initiating bus and the plurality of retry registers to intercept the plurality of commands and retried commands from the retry registers, and to selectively place the commands and the retried commands in the memory array.

5. The bus interface bridge circuit of claim 4, wherein the multiplexing circuit is further coupled to a response portion of the initiating bus to receive command responses for completed commands initiated from the target bus to the initiating bus, and to selectively place the commands, the retried commands, and the command responses in the memory array.

6. The bus interface bridge circuit of claim 1, wherein the target bus interface further includes decode circuitry configured and arranged to decode the attribute code.

7. A system, including the bus interface bridge circuit of claim 1, for transferring commands from a processing unit to one or more of the targeted devices, comprising:

a first bus, coupled between the processing unit and the initiating bus interface, to transfer the commands; and a second bus, coupled between said one or more targeted devices and the target bus interface, to transfer the commands to said one or more targeted devices.

8. A method for transferring commands from an initiating bus to a target bus, the method comprising:

appending control codes, including appending information that identifies whether the command is a read data command or a write data command, and number of bytes of the corresponding command, to each of the commands to produce revised commands, wherein the control codes identify characteristics of their corresponding commands;

contiguously storing the revised commands that are concurrently pending;

providing each of the revised commands to the target bus for distribution to target devices; and decoding the control codes for each of the revised commands received at the target bus, and executing the commands at the target devices in accordance with their identified characteristics; and a plurality of retry registers, each coupled to the initiating bus to receive a different one of the plurality of commands, and each coupled to the memory array to re-enter the commands which are not successfully completed at the target bus.

9. The method of claim 8, wherein contiguously storing comprises storing the revised commands into a single queue.

10. The method of claim 9, wherein storing the revised commands into a single queue comprises storing the revised commands into a first-in-first-out (FIFO) memory array.

11. The method of claim 8, wherein contiguously storing the revised commands comprises storing a first portion of a particular revised command in a first queue location, storing a second portion of the particular revised command in a next available queue location, and contiguously storing additional ones of the revised commands in further available queue locations.

12. The method of claim 11, wherein the first portion of the particular revised command comprises an address, a command identifier, and the corresponding control code, and the second portion of the particular revised command comprises data, byte enable information, and the corresponding control code.

13. The method of claim 8, further comprising retrying the revised commands which are not successfully completed at the target bus.

14. The method of claim 13, wherein retrying the revised commands comprises storing each of the commands initiated at the initiating bus into separate retry registers.

15. The method of claim 14, wherein retrying the revised commands further comprises re-queuing the command stored in the retry register corresponding to the revised command which was not successfully completed at the target bus.

16. The method of claim 15, wherein contiguously storing the revised commands further comprises selecting at least one of the commands stored in the retry registers and the commands initiated at the initiating bus to be queued next.

17. The method of claim 8, wherein contiguously storing the revised commands further comprises contiguously queuing command responses for commands initiated by the target bus to the initiating bus.

18. The method of claim 17, further comprising retrying the revised commands which are not successfully completed at the target bus.

19. The method of claim 18, wherein contiguously storing the revised commands further comprises selecting at least one of the commands stored in the retry registers, the commands initiated at the initiating bus, and the command responses for commands initiated by the target bus to the initiating bus, to be queued next.

20. The method of claim 8, wherein contiguously storing comprises contiguously queuing the revised commands.

21. The method of claim 8, wherein providing each of the revised commands to the target bus comprises providing each of the revised commands to the target bus sequentially.

22. A method for transferring commands from an initiating bus to a target bus, the method comprising:

appending control codes to each of the commands to produce revised commands, wherein the control codes identify characteristics of their corresponding commands;

contiguously queuing both the revised commands which are concurrently pending, and command responses for commands initiated by the target bus to the initiating bus;

sequentially providing each of the revised commands to the target bus for distribution to target devices;

decoding the control codes for each of the revised commands received at the target bus, and executing the commands at the target devices in accordance with their identified characteristics; and retrying the revised commands that are not successfully completed at the target bus, wherein contiguously queuing further includes selecting at least one of the commands stored in retry registers, the commands initiated at the initiating bus, and the command responses for commands initiated by the target bus to the initiating bus, to be queued next.

23. A method for transferring commands from an initiating bus to a target bus, according to claim 22, wherein appending control codes comprises appending information identifying the type and number of bytes of the command.

24. A method for transferring commands from an initiating bus to a target bus, according to claim 22, wherein appending control codes comprises identifying the type of the command comprises identifying whether the command is a read data command or a write data command.

25. A bus interface bridge circuit for transferring commands from an initiating bus to a target bus, the bus interface bridge circuit comprising:

an initiating bus interface configured and arranged to output a plurality of commands, wherein each of the commands includes a corresponding separately-decodable attribute code;

a memory array having a plurality of data registers configured and arranged to contiguously store the plurality of commands;

a target bus interface, coupled to the memory array to successively receive the commands, and to execute the commands at targeted devices in accordance with their separately-decodable attribute codes;

a plurality of retry registers, each coupled to the initiating bus to receive a different one of the plurality of commands, and each coupled to the memory array to re-enter the commands which are not successfully completed at the target bus; and a multiplexing circuit, coupled to the initiating bus and the plurality of retry registers to intercept the plurality of commands and retried commands from the retry registers, and to selectively place the commands and the retried commands in the memory array, the multiplexing circuit further coupled to a response portion of the Initiating bus to receive command responses for completed commands initiated from the target bus to the initiating bus, and to selectively place the commands, the retried commands, and the command responses in the memory array.

26. A bus interface bridge circuit for transferring commands from an initiating bus to a target bus, according to claim 25, wherein the separately-decodable attribute code includes information that identifies the type and number of bytes of the command, and whether the command is a read data command or a write data command.

* * * * *